United States Patent
Lee et al.

(10) Patent No.: US 7,372,785 B2
(45) Date of Patent: May 13, 2008

(54) SPHERICAL ABERRATION COMPENSATION ACTUATOR AND OPTICAL PICKUP SYSTEM

(75) Inventors: Seong Hun Lee, Seoul (KR); In Ho Choi, Seongnam-si (KR); Gin A Kim, Namyangjoo-si (KR); Kwan Woo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 11/027,522

(22) Filed: Dec. 29, 2004

(65) Prior Publication Data

US 2005/0141390 A1 Jun. 30, 2005

(30) Foreign Application Priority Data

Dec. 30, 2003 (KR) .................. 10-2003-0100440

(51) Int. Cl.
*G11B 7/00* (2006.01)
(52) U.S. Cl. ................... 369/44.14; 369/44.15; 369/112.01
(58) Field of Classification Search ............... None
See application file for complete search history.

(56) References Cited

U.S. PATENT DOCUMENTS

| 7,200,098 B2* | 4/2007 | Yoo et al. ............ 369/112.23 |
| 2003/0021219 A1 | 1/2003 | Nagai |
| 2005/0281169 A1* | 12/2005 | Kimura et al. ......... 369/112.01 |

* cited by examiner

*Primary Examiner*—Muhammad Edun
(74) *Attorney, Agent, or Firm*—Lee, Hong, Degerman, Kang & Schmadeka

(57) ABSTRACT

A spherical aberration compensation actuator and an optical pickup system are provided. The spherical aberration compensation actuator mounts an element for compensating a spherical aberration and operates to a single-axis direction on an optical path using electromagnetic force. The optical pickup system includes a laser diode, an object lens, a spherical aberration compensation actuator, an optical path changer, and an optical detector. The spherical aberration compensation actuator is installed on an optical path between the laser diode and the object lens and includes a lens holder having a spherical aberration compensation element for compensating a spherical aberration generated due to light passing through the object lens and operating in an optical-axis direction using electromagnetic force.

20 Claims, 14 Drawing Sheets

SPHERICAL ABERRATION COMPENSATION ACTUATOR AND OPTICAL PICKUP SYSTEM

CROSS-REFERENCE TO RELATED APPLICATIONS

Pursuant to 35 U.S.C. § 119(a), this application claims the benefit of earlier filing date and right of priority to Korean Application No. 100440/2003, filed on Dec. 30, 2003, the contents of which are hereby incorporated by reference herein in their entirety.

BACKGROUND OF THE INVENTION

1. Field of the Invention

The present invention relates to an optical pickup system, and more particularly, to a spherical aberration compensation actuator and an optical pickup system capable of compensating a spherical aberration by operating a spherical aberration compensation element provided on an optical path in single-axial direction.

2. Description of the Related Art

Due to a high density trend in an optical recording technology, a laser diode of a more shorter wavelength and an object lens having a more greater numerical aperture (NA) are widely used.

With such a trend, an optical system of a blue laser diode (BD) class is suggested. In the optical system of the BD class, a blue laser beam of a high numerical aperture (e.g., NA=0.85) and a short wavelength (e.g., 405 nm) is used.

FIG. 1 is a schematic view illustrating a construction of a related art BD-class optical pickup system.

As illustrated in FIG. 1, the optical system includes: a blue laser diode 101 for generating a blue laser beam; a beam splitter 102 for reflecting or transmitting the generated beam; a collimator lens 103 for converting the incident beam into a parallel beam and illuminating the parallel beam; an object lens 104 for condensing the incident beams from the collimator lens 103 onto an optical disk 105 and delivering a reflected beam reflected from the optical disk 105 to the collimator lens 103; and an optical detector 106 for detecting the beam reflected by the beam splitter 102 in form of an electrical signal.

In operation, a laser beam generated from the BD 101 passes through the beam splitter 102 and the beam that has passed through the beam splitter 102 is converted into a parallel beam by the collimator lens 103 and provided to the object lens 104.

The object lens 104 condenses the incident beams onto one point on the optical disk 105 to record or play information. At this point, the condensed beam is reflected by the optical disk 105 and the reflected beam passes through the object lens 104 and the collimator lens 103 positioned on a reflection path and is incident to the optical detector 106 by the beam splitter 102. Here, the object lens is mounted on the optical pickup actuator and operated in a tracking and a focusing directions.

The optical detector 106 converts reflected and inputted information into an electrical signal, thereby controlling a tracking servo and a focusing servo.

In the meantime, as a high density trend of the disk progresses, various technical difficulties are emerging. A representative difficulty among them is a spherical aberration generated due to use of a large-diameter lens. The spherical aberration is generated because a focus at which light passing through a principle axis of the object lens is condensed and a focus at which light passing through an outer periphery of the object lens is condensed are varied in their position on the same optical axis.

Therefore, the spherical aberration is greatly influenced by a laser wavelength and a thickness of a cover layer of the optical disk.

In the meantime, since the beams are not exactly condensed onto an optical recording medium in an optical system where the spherical aberration is generated much, power transfer of the laser diode gets inefficient and a signal-to-noise (S/N) ratio is deteriorated when reading data. Further, for high integration and high capacity of data, the BD-class optical system has two layers on its disk. In the above BD-class optical system, the spherical aberration generated due to a deviation of the disk cover layer exceeds an optical aberration tolerance, for a wavelength of a light source used is short, or the spherical aberration is generated due to a deviation of each layer while a dual layer disk is used for increasing a storage density. Particularly, an optical element should be offset on an optical path appropriately for a relevant disk layer in order to compensate a spherical aberration due to a deviation of each disk cover layer generated by recording/playing of the dual layer disk.

One of representative methods used for solving the above problems is to correct a spherical aberration by inserting a liquid crystal plate in a general optical pickup structure. Though such a method has advantages of being able to actively control a spherical aberration in a relatively exact manner, there are disadvantages that big spherical aberrations are generated unless the liquid crystal plate is simultaneously moved when the object lens performs a tracking movement, thus the liquid crystal plate should be installed just in front of the object lens and cooperated using an actuator.

Another spherical aberration correction method requires a single-axis driving servo system which moves an optical element on an optical axis to compensate a spherical aberration as illustrated in FIG. 2.

As illustrated in FIG. 2, in a related art single-axis actuator for compensating a spherical aberration, a beam expander 110 for compensating a spherical aberration includes: a collimator lens 112 mounted on a central portion of a lens holder 111; a motor 113 for operating the lens holder 111; a lead screw 114 for being rotated at one side of the lens holder 111 by the motor 113 so as to operate the lens holder 111; and a shaft 115 for guiding movements of the lens holder 111 at the other side of the lens holder 111.

The beam expender moves the lens holder 111 to an optical-axis direction so as to compensate a spherical aberration due to the collimator lens 112. For that purpose, if the motor 113 is operated in a forward or a backward direction, the lead screw 114 connected with a shaft of the motor is rotated to move the lens holder 111 back and forth and the shaft 115 on the other side of the lens holder guides movements of the lens holder 111. Accordingly, an offset of the collimator lens 112 is adjusted and a spherical aberration is compensated.

However, since the lead screw 114 which is the shaft of the motor 113 is installed on one side of the lens holder 111, force that operates the lens holder 111 may be concentrated on one side. Further, in case a lead screw method is used, a separate motor-screw system should be provided, which results in disadvantages in viewpoint of cost and assembly efficiency.

Further, the beam expender requires a high-precision operation for a spherical aberration compensation. In addition, an angle tilt should be minimized during operation in order to secure operation precision of less than several μm and a tilt margin of an optical element. Still further, since feedback for position information is required in real time in case a separate servo system is provided, a circuit system should be additionally provided.

SUMMARY OF THE INVENTION

Accordingly, the present invention is directed to a spherical aberration compensation actuator and an optical pickup system that substantially obviate one or more problems due to limitations and disadvantages of the related art.

An object of the present invention is to provide a spherical aberration compensation actuator for operating a spherical aberration compensation element using electromagnetic force in order to compensate a spherical aberration that may be generated due to a deviation of a disk layer for recording/playing optical information of high density.

Another object of the present invention is to provide an optical pickup system capable of installing a spherical aberration compensation actuator having magnetic circuits and a spherical aberration compensation element on an optical path to offset the spherical aberration compensation actuator with a high precision in an optical-axis direction using electromagnetic force from the magnetic circuits, thereby compensating the spherical aberration due to a deviation of a disk layer.

Still another object of the present invention is to mount a collimator lens as a spherical aberration compensation element on a spherical aberration compensation actuator and provide magnetic circuits for generating operating force to an optical-axis direction and a guider for guiding operation to an optical-axis direction on left/right sides of the spherical aberration compensation actuator, thereby achieving simple construction without using a high-priced motor.

Further still another object of the present invention is to provide coils and magnets as magnetic circuits for operating a lens holder on which a spherical aberration compensation element is mounted and provide a magnetic iron piece for generating magnetic restoring force on a position facing a polar boundary of the magnets, thereby changing a sensitivity and a resolution.

Yet another object of the present invention is to provide shafts and shaft guide grooves as a guider for guiding operation of a lens holder to an optical-axis direction, at least one shaft guide groove performing a two-direction guide and the other shaft guide groove performing a four-direction guide.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a spherical aberration compensation actuator, which includes: a spherical aberration compensation element for compensating a spherical aberration on an optical path; a lens holder for mounting the spherical aberration compensation element and operating to an optical-axis direction; magnetic circuits installed in left/right sides of the lens holder and including coils, magnets, and yokes for generating electromagnetic force operating the lens holder; a rotation guider for guiding operation of the lens holder to an optical-axis direction; and a supporter for supporting the rotation guider and the yokes.

In another aspect of the present invention, there is provided an optical pickup system, which includes: a laser diode for generating laser beams; an object lens for condensing the laser beams onto an optical disk; a spherical aberration compensation actuator installed on an optical path between the laser diode and the object lens and including a spherical aberration compensation element for compensating a spherical aberration generated by light that passes through the object lens and a lens holder for operating to an optical axis direction under influence of electromagnetic force; an optical path changer for selectively changing a path of the beams depending on their incident direction; and an optical detector for detecting an electrical signal of the beams reflected from the disk.

According to the present invention, a spherical aberration compensation actuator is installed using electromagnetic and magnetic principles on an optical path in order to compensate a spherical aberration that may be generated in an optical system such as a BD-class optical system or more advanced optical system, so that a high-priced motor may not be additionally used anymore, whereby manufacturing cost is reduced. Further, in case sensitivity and resolution adjustments are required during operation depending on system requests, it is possible to change the sensitivity and the resolution by adjusting a thickness and a size of the magnetic iron piece and a distance with respect to the magnet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
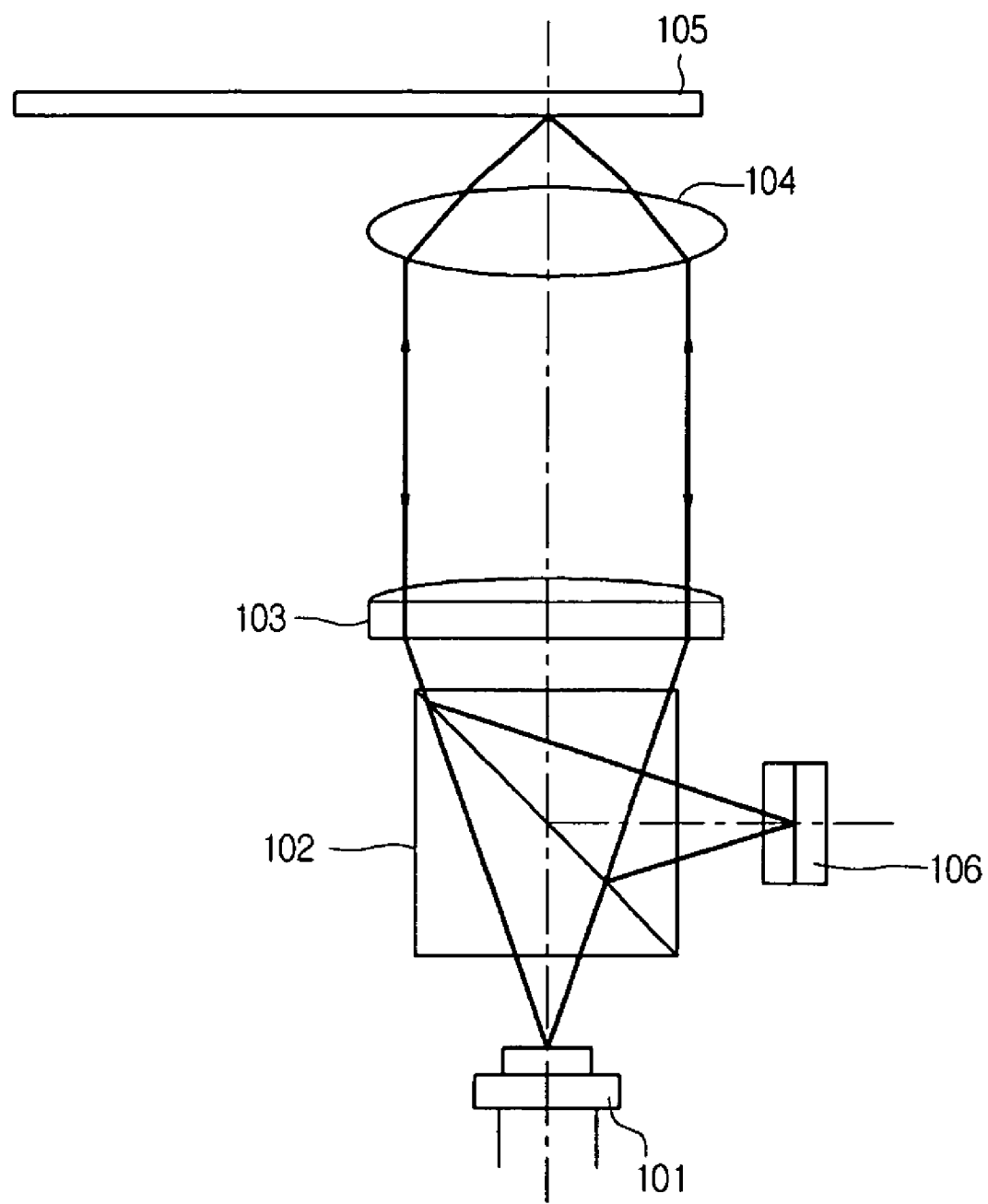
FIG. 1 is a view illustrating a construction of a related art BD-class optical pickup apparatus.
Figure 2:
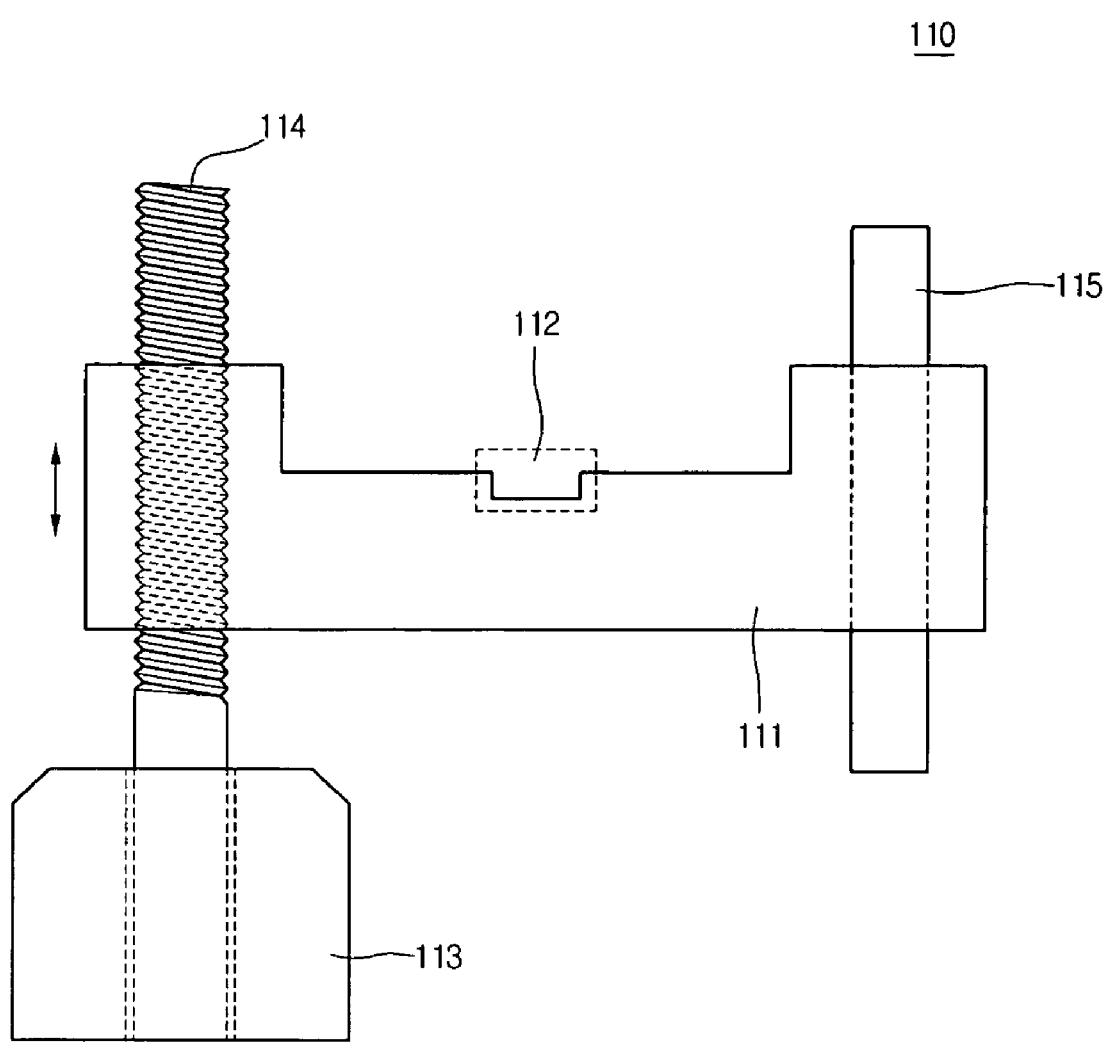
FIG. 2 is a view illustrating a structure of a spherical aberration compensation actuator applied to the related art of FIG. 1.
Figure 3:
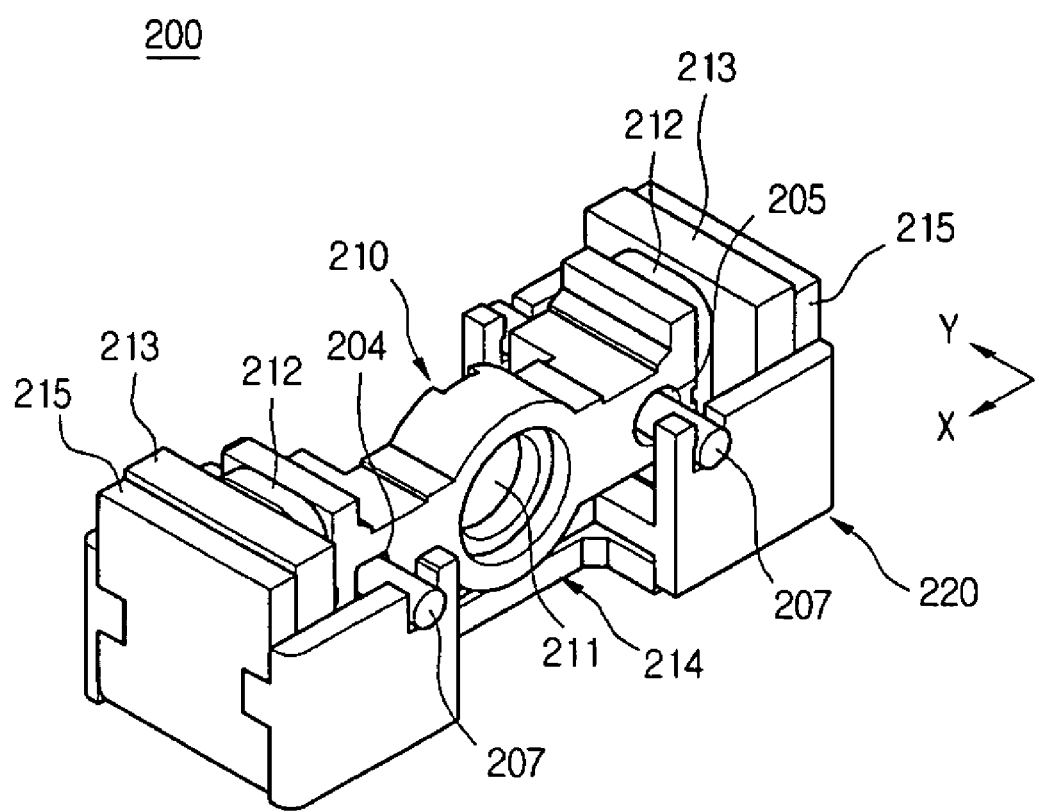
FIG. 3 is a perspective view illustrating a structure of a spherical aberration compensation actuator in the BD-class optical pickup apparatus according to an embodiment of the present invention.
Figure 4:
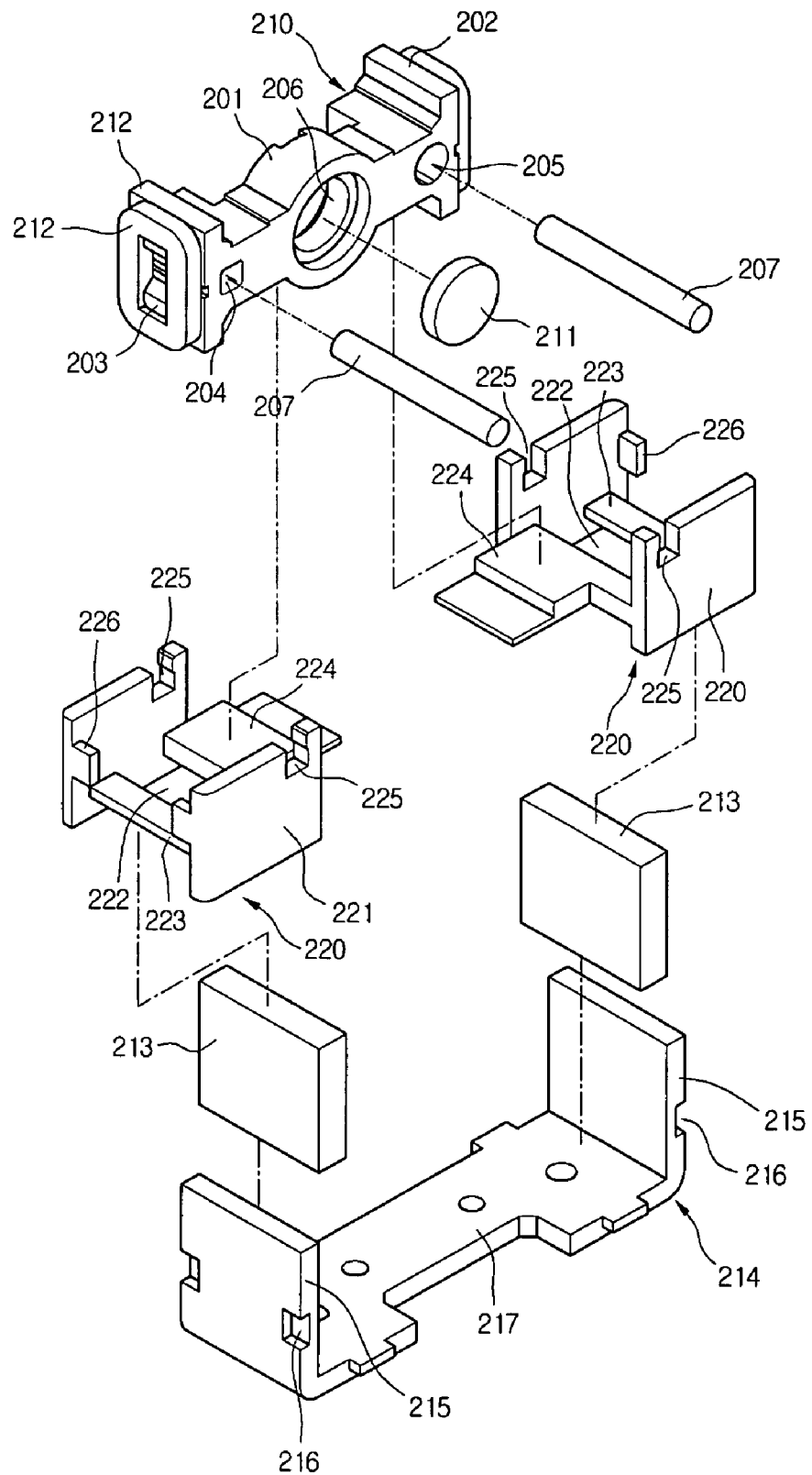
FIG. 4 is an exploded, perspective view of FIG. 3.
Figure 5:
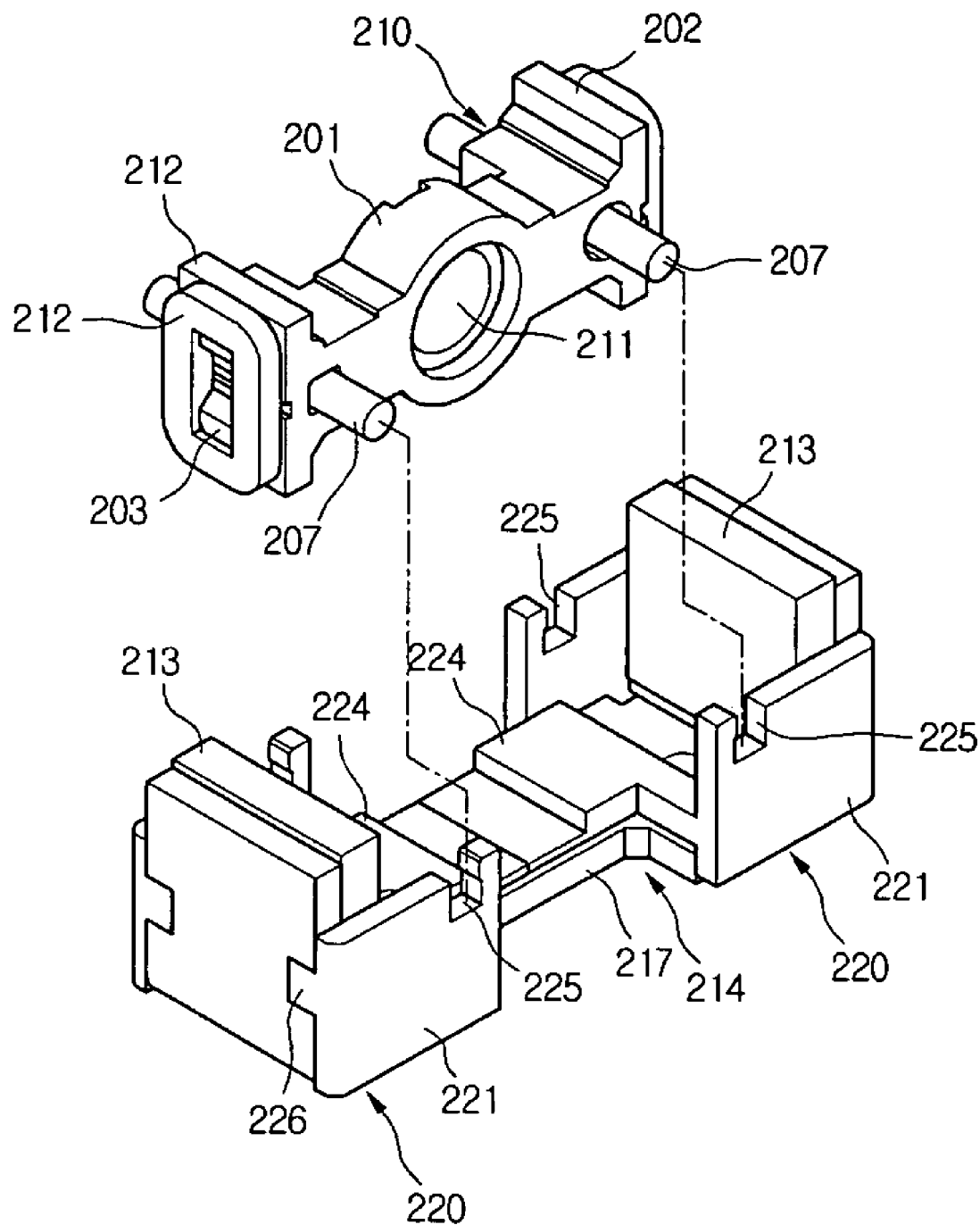
FIG. 5 is a partial, joined, perspective view of FIG. 4.

FIG. 3 is a perspective view illustrating a spherical aberration compensation actuator according to the present invention, FIG. 4 is an exploded perspective view of FIG. 3, and FIG. 5 is a perspective view illustrating a partial, joined state of FIG. 4.

Referring to FIGS. 3 to 5, the spherical aberration compensation actuator includes: a lens holder 210 on which a collimator lens 211 is mounted and for operating to an optical-axis direction; a magnetic circuit including coils 212, magnets 213, and yokes 215 positioned on left/right sides of the lens holder, for operating the lens holder 210; a yoke plate 214 having the yokes 215 protruded from its left/right sides; shaft guide grooves 204 and 205 and shafts 207 for guiding operation of the lens holder 210; and a base 220 for supporting both sides of the shafts 207 and the yoke plate 214.

The spherical aberration compensation actuator according to an embodiment of the present invention will be described with reference to the accompanying drawings in the following.

Referring to FIG. 3, the spherical aberration compensation actuator 200 mounts an optical element in its inside and operates to a single-axis (Y-axis) direction that corresponds to an optical-axis direction to compensate a spherical aberration due to a deviation of a disk cover layer. Here, the optical element may be, for example, a collimator lens as a spherical aberration compensation element. For another embodiment, a concave lens or a convex lens of a beam expander may be applied for the spherical aberration compensation element.

The spherical aberration compensation actuator 200 may be a single-axis actuator performing a straight line motion to the optical-axis (Y-axis) direction and include the lens holder 210 which operates, the yoke plate 214 which is fixed, and the base 220.

The lens holder 210 mounts the collimator lens 211 on its central portion and has the coils 212 on its left/right sides, and has the shafts 207 joined in the optical-axis direction at its left and right.

The coils 212 face the magnets 213 in their outer sides and the magnets 213 are attached to an inner surface of the yokes 215 protruded from the yoke plate 214, respectively. The base 220 supports the yoke plate 214 and the shafts 207.

The spherical aberration compensation actuator 200 operates in the following way. If a current is applied to the coils 212 mounted on the left/right sides of the lens holder 210, the lens holder 210 and the collimator lens 211 are moved back and forth to the optical-axis direction under influence of electromagnetic force generated between the coils 212 and the magnets 213. The shafts 207 joined on the left/right of the lens holder 210 guide operation of the lens holder 210 actuated by the magnetic circuits with their both ends attached to the base 220. At this point, as a distance from lenses is varied due to operation of the collimator lens 211 in the optical-axis direction, a parallel beam passing through the collimator lens is varied in its diverging angle. By actively controlling the diverging angle, it is possible to compensate the spherical aberration.

The spherical aberration compensation actuator will be described in more detail with reference to FIGS. 4 and 5.

Referring to FIGS. 4 and 5, the lens holder 210 has a lens seat 201 on its central portion and has magnetic circuits on its left/right sides. The lens seat 201 has a beam-pass hole 206 formed in its inside and a spherical aberration compensation element is seated in the beam-pass hole 206. The spherical aberration compensation element may be, for example, the collimator lens 211.

The left/right magnetic circuits 212 include the coils 212, the magnets 213, and the yokes 215 and generates operating force for actuating the lens holder 210. The coils 212 are wound on coil fixing protuberances 203 formed on outer sides of coil fixing parts 202 provided to left/right sides of the lens holder 210.

Here, the coils 212 are vertically wound on the coil fixing protuberances 203 formed on the outer sides of the coil fixing parts 202. In addition, the coil fixing parts 202 on the left/right sides may not provide the coil fixing protuberances 203 but, instead, may directly attach a bobbin on which the coils are wound.

Further, the shaft guide grooves 204 and 205 are formed in a passing through manner to an axial direction on the left/right of the lens holder 210. The shapes of the shaft guide grooves may be formed in the same shape of a circle or a polygon or in different shapes. The shafts 207 are joined to the shaft guide grooves 204 and 205, respectively.

Here, the shaft guide grooves 204 and 205 and the shafts 207 are installed in a height that corresponds to a lens center in order to appropriately guide the lens holder 210 to the optical-axis direction and arranged to form a left/right symmetry with respect to the lens.

Further, the yoke plate 214 is formed in a U-shape to maximize magnetic flux and includes the yokes 215 and the yoke body 217. The yokes 215 are vertically bent on both sides of the yoke body 217 and have the magnets 213 attached on their inner surface to face the coils 212. A plurality of yoke fixing grooves 216 for fixing the yoke plate 214 are formed on an outer side of the yokes 215.

Here, the magnets 213 have two polarities (S:N) installed in an axial direction and may be configured by two monopoles or by one bipolar magnet. The magnets are installed such that vertical centers of the coils 212 are positioned on a polar boundary of the magnets 213. Force generated between the coils 212 and the magnet 213 is Lorentz force. The Lorentz force is generated in the optical-axis direction to actuate the lens holder 210.

The bases 220 are provided to the left/right sides so as to support and fix the whole actuator and support the shafts 207 and the yoke plate 214.

The bases 220 include side support frames 221, lower support frames 223, and upper support frames 224. The side support frames 221 are vertically installed back and forth of the actuator to confine an operation range of the lens holder 210 received therein. The side support frames 221 have shaft fixing grooves 225 on their upper edge and have the yoke fixing protuberances 226 protruded inward from its another edge. Both ends of the shafts 207 are joined to the shaft fixing grooves 225, respectively. The yoke fixing protuberances 226 are fit into the yoke fixing grooves 216 of the yokes 215, respectively. Here, for another example, the yoke fixing protuberances may be formed on the yokes 215 and the yoke fixing grooves may be formed on the side support frames 221 to be joined each other.

The lower and the upper support frames 223 and 224 of the bases 220 are integrally formed in different heights between the side support frames 221 and a yoke-pass groove is formed between the lower and the upper support frames 223 and 224. The lower support frame 223 is formed in a height lower than a height of the upper support frame 224 as much as a thickness of the yoke body 217. Accordingly, the yokes 215 on both sides of the yoke plate 214 pass through the yoke-pass groove 222. At this point, if the bases 220 are moved inward close each other, a backside of the yoke body 217 is seated on the lower support frame 223 and the upper support frame 224 is seated on an upper side of the yoke body 217.

That is, since the lower support frames 223 and the upper support frames 224 of the bases 220 are closely joined to the left/right sides, the backside, and the upper side of the yoke plate 214, up/down movements of the yoke plate 214 are prevented. Further, the yokes 215 are prevented from moving to the left/right direction by the yoke fixing protuberances 226 and the yoke fixing grooves 216. Here, a width of the yoke-pass grooves 222 is the same as or greater than that of the yoke.

Joining process of the spherical aberration compensation actuator will be described with reference to FIGS. 4 and 5 in the following.

First, the magnets are attached to the yokes 215 bent on both sides of the yoke plate 214 and the yokes 215 are passed through the yoke-pass grooves 222 of the bases 220. The backside and the upper side of the yoke plate 214 are seated on the lower and the upper support frames 223 and 224, respectively. At this point, the yoke fixing protuberances 226 formed on the side support frames 221 are fitted into the yoke fixing grooves 216 formed on the outer side of the yoke 215. In this manner, the yoke plate 214 is fixed to the bases 220.

The magnets 213 are attached to the inner side of the yokes of the yoke plate 214. Here, the bases 220 may be joined to the yoke plate 214 first and the magnets 213 may be mounted later.

The collimator lens 211 is seated in the beam-pass hole 206 of the lens holder 210 and the coils 212 are wound on the left/right sides. With such a state, the shafts 207 are joined into the shaft guide grooves 204 and 205 formed on the left/right of the lens holder 210. Both ends of the shafts 207 joined to the lens holder 210 are fitted into and fixed to the shaft fixing grooves 225 formed on an upper end of the side support frame 221.

Here, the shaft fixing grooves 225 are configured such that its upper width is narrow and its lower width is wide. That is, referring to FIG. 12, shaft-detachment prevention protuberances 227 are formed on one side of the shaft fixing grooves 225, so that upward detachment of the shafts 207 fitted into the shaft fixing grooves 225 are prevented.

Accordingly, the lens holder 210 is positioned by floating above a predetermined height along an inner side of the yoke plate 214 thanks to the shafts 207 and the outer coils 212 of the lens holder 210 face the magnets 213.

Then, since the coils 212 on the left/right sides of the lens holder 210 face the magnets 213 and the yokes 215, the lens holder 210 is actuated to the optical-axis direction together with the collimator lens 211 by electromagnetic force generated between the coils 212 and the magnets 213 depending on a direction and a size of a current applied to the coils 212. At this point, the lens holder 210 moves back and forth along the shafts 207.

Figure 6:
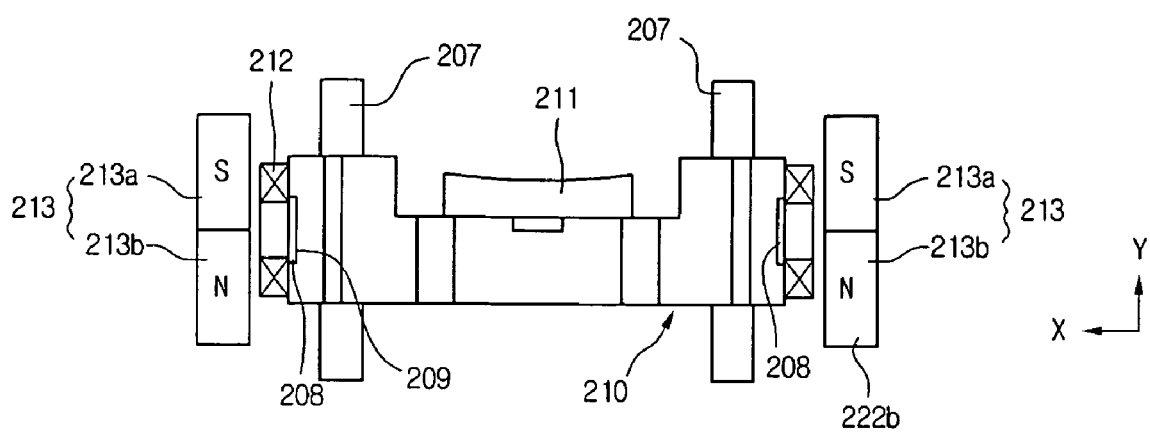
FIG. 6 is a view illustrating a construction of a magnetic circuit in a spherical aberration compensation actuator according to the present invention.
Figure 7:
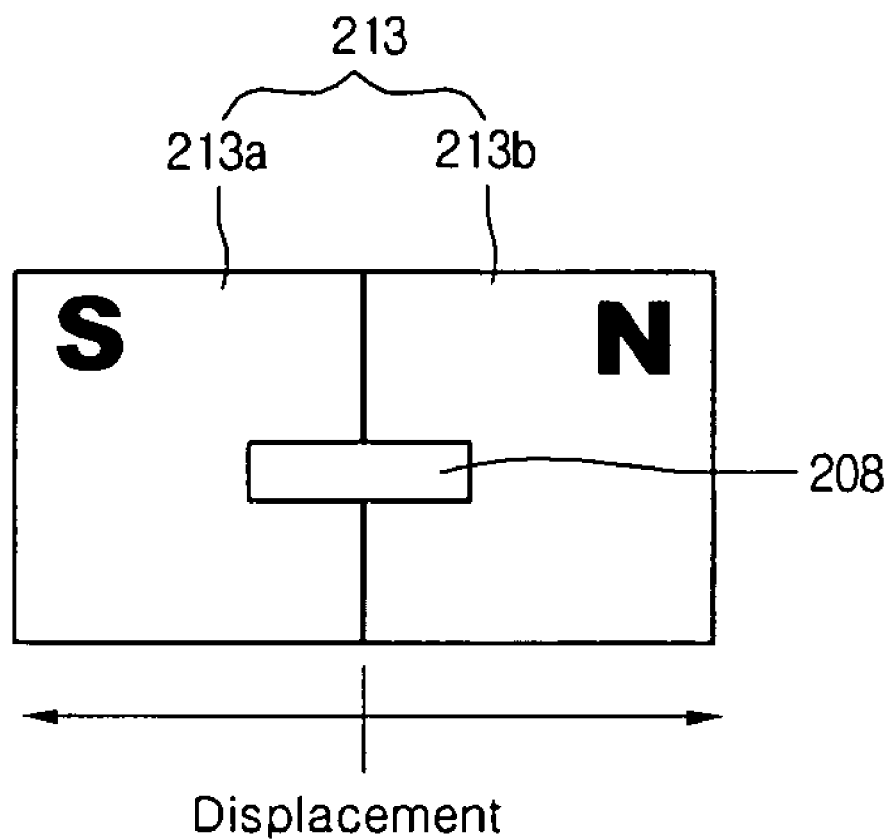
FIG. 7 is a view illustrating magnetic restoring force due to a magnetic spring according to the present invention.

The magnetic circuit is illustrated in FIGS. 6 and 7.

Referring to FIGS. 6 and 7, the coils 212 are joined to the left/right sides of the lens holder 210 and magnetic iron pieces 208 are joined to a central portion of the coils 212. For the magnets 213 facing the coils and the magnetic iron pieces, magnets 213a and 213b having two polarities (S:N) in the optical-axis direction are used. Here, for another example, it is possible to control operation of the lens holder to the optical-axis direction by arranging a plurality of coils in the optical-axis direction to use electromagnetic force due to interaction between the coils and a monopole magnet.

The magnetic iron pieces 208 are installed on central portions on left/right sides of the lens holder 210. The magnetic iron pieces 208 are elastic springs formed on the left/right sides of the lens holder 210 and seated on a "⊂'-shaped iron piece fixing groove 209. The magnetic iron pieces 208 face the poles of the magnets 213. That is, the centers of the coils 212 and the centers of the magnetic iron pieces 208 are positioned on a polar boundary of the magnets 213 (213a and 213b).

Further, the magnetic iron pieces 208 can be fixed without a separate assembly zig by being inserted into the piece fixing grooves 209 and then just stuck thereon. When controlling rigidity of the magnetic spring with the piece fixing grooves 209 remained at a predetermined depth, it is possible to change the rigidity by modifying only a thickness of the magnetic iron pieces 208 without modification of the lens holder 210.

Figure 8:
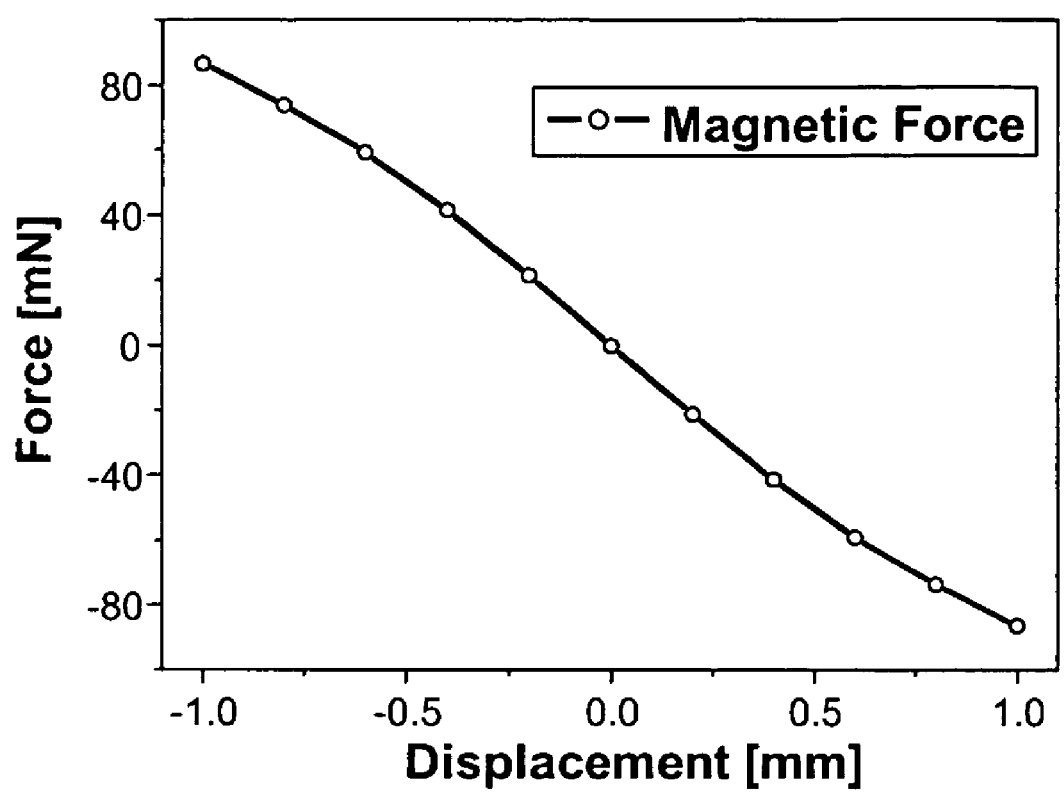
FIG. 8 is a view illustrating magnetic restoring force due to movements of a lens holder according to an embodiment of the present invention.

FIG. 8 is a graph illustrating correlation of force with respect to a displacement due to interaction between the magnetic iron pieces 208 and the magnets 213 illustrated in FIG. 7. The displacement of the magnetic iron pieces 208 due to operation of the lens holder is inversely proportional to force of the magnets 213.

Further, the magnetic iron pieces 208 are positioned on a polar boundary (S:N) of the magnets 213. A most highest magnetic density is formed between polarities of the magnets 213 and the magnetic iron pieces 208 have a tendency to be positioned at a stable point of potential energy between the polarities. Therefore, if the magnetic iron pieces 208 get off the polar boundary of the magnets 213, restoring force intending to restore to an original state is generated.

Accordingly, the lens holder 210 may be fixed at a predetermined position by a difference between electromagnetic force generated due to interaction between the coils 212 and the magnets 213 and magnetic restoring force. That is, it is possible to change a sensitivity and a resolution by controlling only a thickness and a size of the magnetic iron pieces 208 and a distance between the magnetic iron pieces and the magnets 213.

Figure 9:
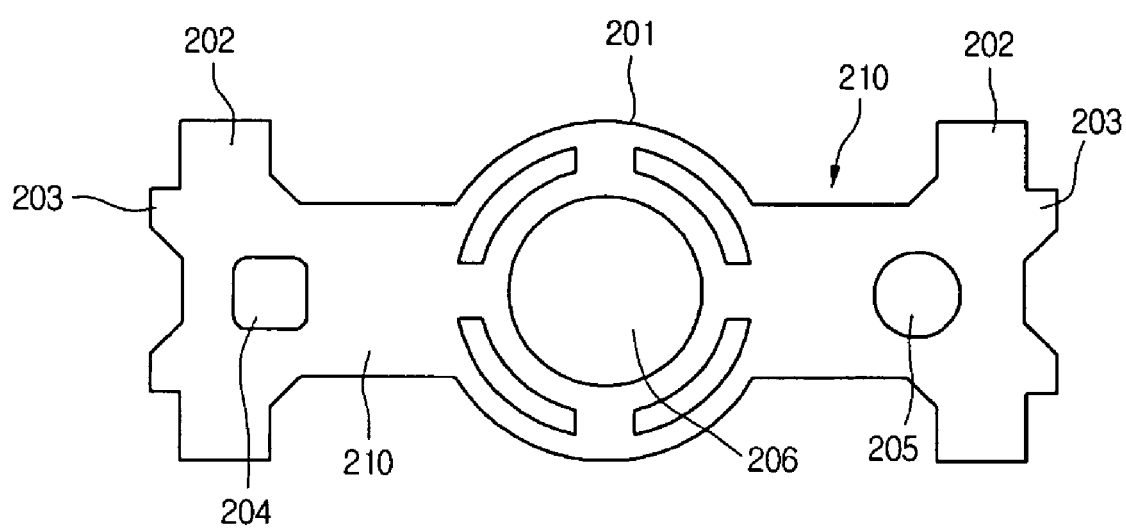
FIG. 9 is a view illustrating a shape of a lens holder shaft guider according to the present invention.

In the meantime, referring to FIG. 9, the shaft guide grooves 204 and 205 formed on the left/right of the lens holder 210 are formed in different shapes. That is, the shaft guide groove 205 formed on the right side of the lens holder 210 is formed in a circular shape so that two-direction guide of up/down and left/right may be possible and the shaft guide groove 204 formed on the left side is formed in a square shape so that guide to an up/down direction may be possible. With such a configuration, when frictional force between the shafts 207 and the lens holder 210 is increased due to tilt of the lens holder 210 that may be generated while operation, a degree of freedom is released and the lens holder can be operated.

Figure 10:
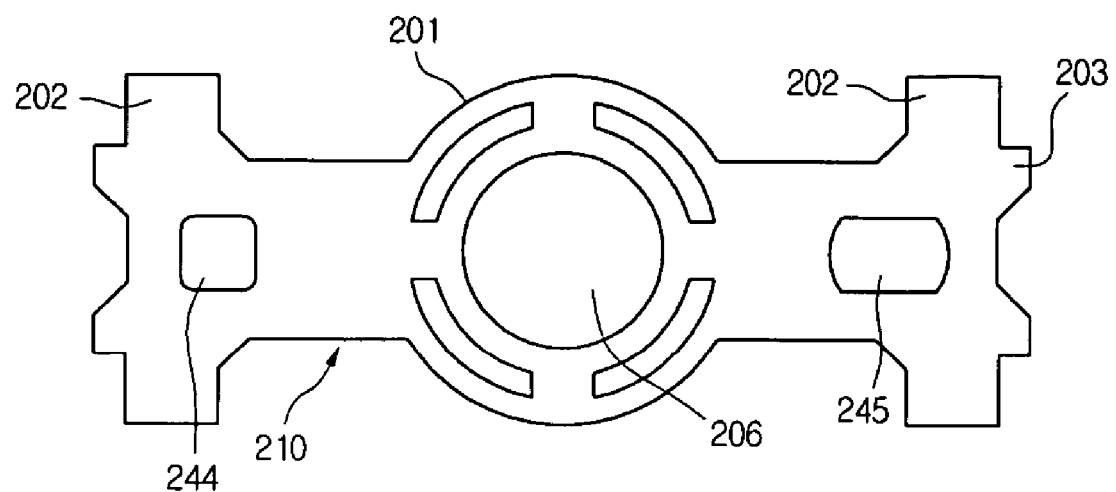
FIG. 10 is a view illustrating another shape of a lens holder shaft guider according to the present invention.

FIG. 10 is a view illustrating another embodiment of the shaft guide grooves according to the present invention. A left shaft guide groove 244 of the lens holder 210 is of a square shape to guide the lens holder 210 in an up/down direction and a left/right direction and a right shaft guide groove 245 is formed in a rectangular shape to freely move the lens holder 210 to a left/right direction.

Figure 11:
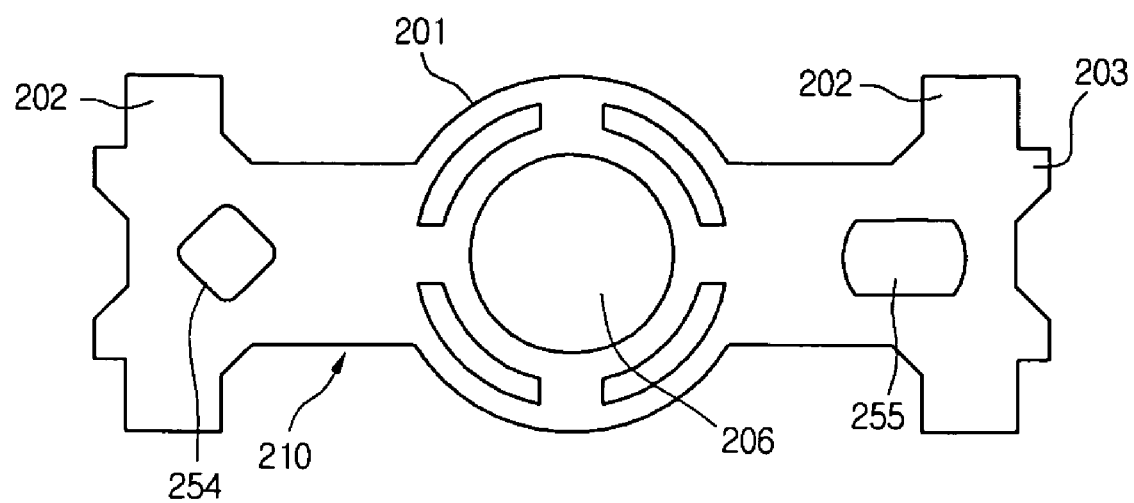
FIG. 11 is a view illustrating another shape of a lens holder shaft guider according to the present invention.

FIG. 11 is a view illustrating still another embodiment of the shaft guide grooves according to the present invention. A left shaft guide groove 254 of the lens holder 210 is of a rhombus shape to freely move the lend holder to all directions of up/down and left/right directions and a right shaft guide groove 255 is formed in a rectangular shape to freely move the lens holder to a left/right direction.

Figure 12:
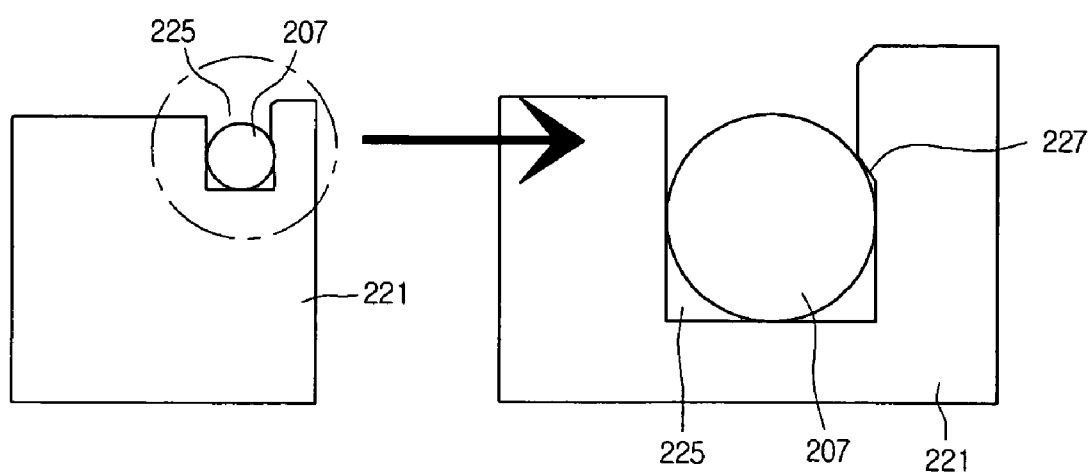
FIG. 12 is a view illustrating a structure of a shaft guide groove according to an embodiment of the present invention.

FIG. 12 is a view illustrating a member for fixing the shafts 207 according to the present invention. The shafts 207 inserted, in an axial direction, into the left/right of the lens holder are fitted into the shaft fixing grooves 225 formed on the upper ends of the side support frames 221 of the bases 220. At this point, the shafts 207 which will be fitted into the shaft fixing grooves 225 is fitted in a forcibly fitting manner by the shaft-detachment prevention protuberances 227 formed on an inner side of the shaft fixing grooves 225, so that upward detachment of the shafts is prevented. That is, the shafts are fixed in a snap-fit type.

Further, an inclined plane is formed on the shaft-detachment prevention protuberances 227 of the shaft fixing grooves 225 so as to contact a circumference of the shafts 207 and the inner diameter of the shaft fixing grooves 225 is made smaller than a diameter of the shafts 207, so that the shafts 207 may be fixed into the shaft fixing grooves 225 in a forcibly fitting manner.

Here, a portion's diameter of the shaft fixing grooves 225 where the shafts are confined is made smaller than a diameter of the shafts 207. Accordingly, if the shafts 207 are pushed into the portion, force is applied in an axial direction and a direction perpendicular to the shafts 207, so that the shafts 207 can be seated stably on the shaft fixing grooves 225 without shaking of the shafts 207 and further an alignment of the shafts is improved.

For another embodiment, thresholds may be formed on both ends of the shafts and fitted into the shaft fixing grooves 225 or the both ends of the shafts may be formed in a polygonal shape.

The above-described spherical aberration compensation actuator is installed on an optical path, i.e., between the laser diode and the object lens and controls operation of the collimator lens as a spherical aberration compensation element to the optical-axis direction precisely, thereby compensating the spherical aberration in a high density disk. One or more spherical aberration compensation actuators may be installed and the spherical aberration for a plurality of light sources can also be compensated.

Figure 13:
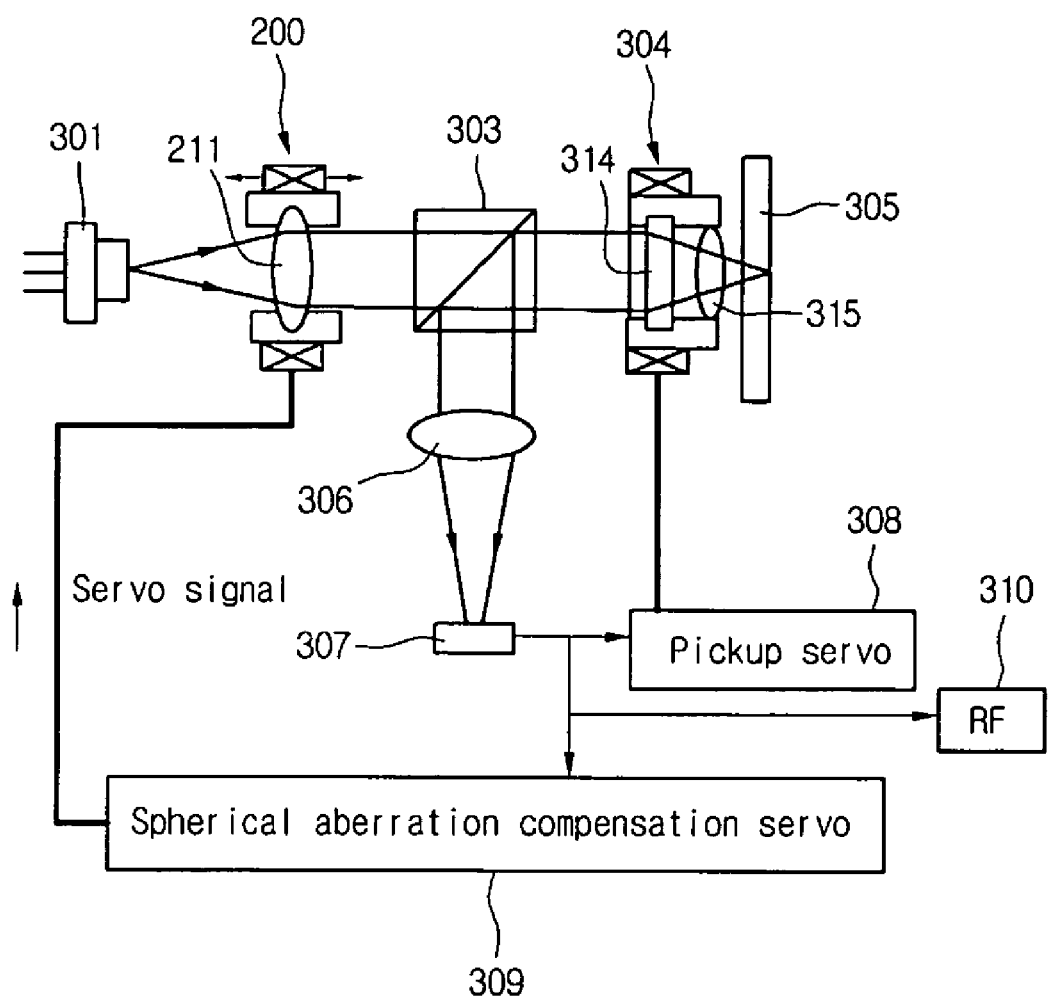
FIG. 13 is a view illustrating a construction of an optical pickup system for performing a servo operation using a condenser jitter signal in an optical pickup apparatus having the spherical aberration compensation actuator of FIG. 3.
Figure 14:
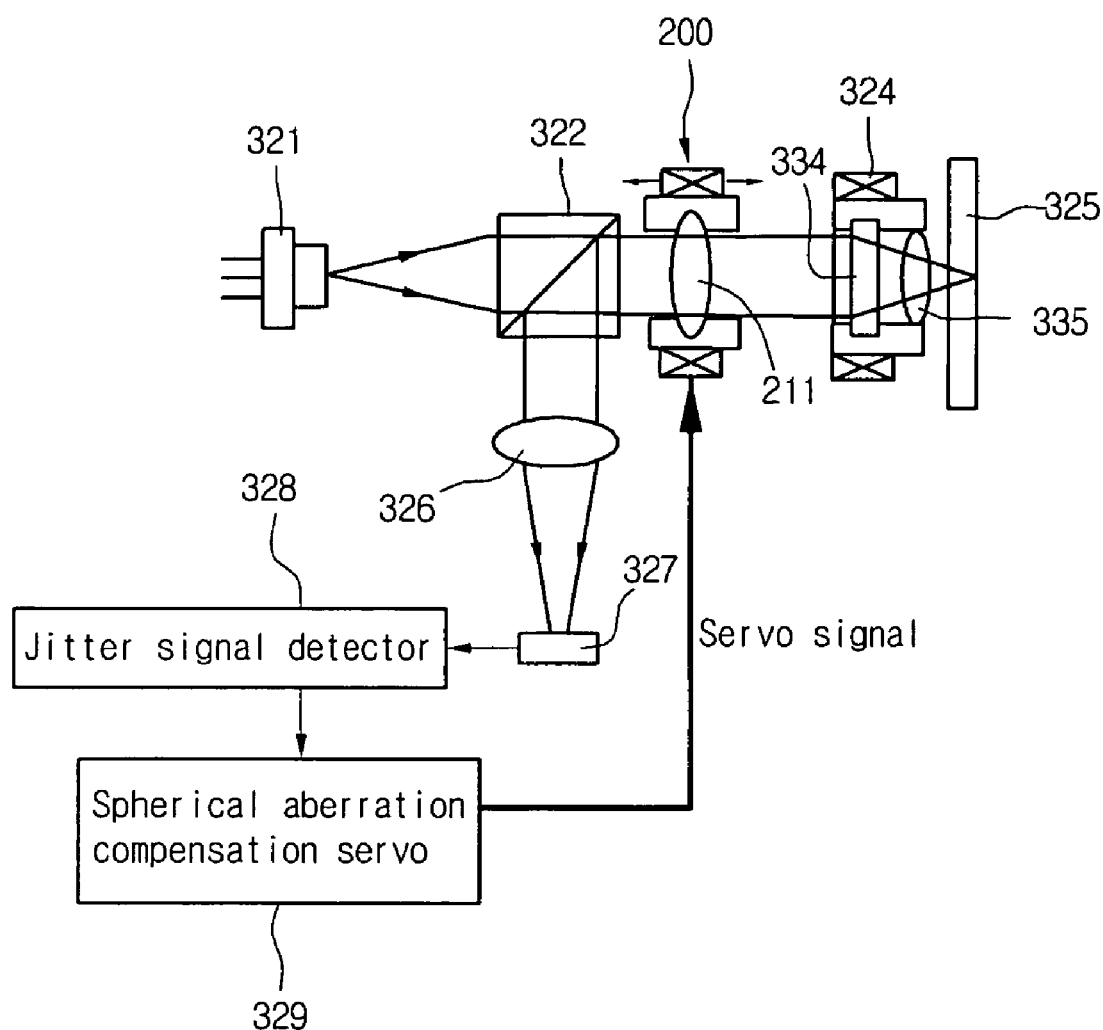
FIG. 14 is a view illustrating another construction of an optical pickup system for performing a servo operation using a condenser jitter signal in an optical pickup apparatus having the spherical aberration compensation actuator of FIG. 3.

In the meantime, an optical pickup system having a spherical aberration compensation actuator according to the present invention is illustrated in FIGS. 13 and 14.

FIG. 13 is a view illustrating a construction of an optical pickup system having a spherical aberration compensation actuator according to an embodiment of the present invention. In operation, laser beams generated from a blue laser diode 301 are converted into parallel beams by means of a collimator lens 211 mounted on a center of a spherical aberration compensation actuator 200 and incident to a beam splitter 303.

The beams incident to the beam splitter 303 are passed through and condensed onto one point on an optical disk 305 through an object lens 315 of the pickup actuator 304.

Here, a holographic optical element (HOE) 314 is provided to an incident side of the object lens 315. The HOE 314 may be installed as an optical element for playing or transforming a waveform recorded on a hologram to obtain a desired waveform.

The laser beam focused onto the optical disk 305 is reflected and the reflected beam is incident to the beam splitter 303 again through the object lens 315 and reflected to an optical detector direction, so that an optical path is changed. The reflected light beam passes through the condensing lens 306 and is condensed to an optical detector 307.

At this point, the optical detector 307 detects an electrical signal on the basis of the reflected light beam to output a pickup servo signal and a high frequency signal (RF). Using the detected electrical signal, a pickup servo 308 controls a size and a direction of a current applied to the pickup actuator 304, thereby controlling operation to at least two or more axes directions. Further, the electrical signal detected by the optical detector 307 is inputted to a spherical aberration compensation servo 309.

The spherical aberration compensation servo 309 delivers a servo signal for compensating a spherical aberration to the spherical aberration compensation actuator 200 on the basis of the electrical signal detected at the optical detector 307 to control operation of the spherical aberration compensation actuator 200. Accordingly, the collimator lens 211 of the spherical aberration compensation actuator 200 positioned on an optical path is moved to an optical-axis direction, so that a distance between the lenses is varied and the parallel beams that have passed through the collimator lens 211 come to have an appropriate phase distribution and intensity to compensate a spherical aberration.

That is, complex influences including a wavelength of a beam, a thickness of a disk cover, and a phase change depending on a position of the collimator lens 211 cause a spherical aberration and a value corresponding thereto is provided to the spherical aberration compensation servo 309 as a feedback, so that an operation of actively reducing the spherical aberration is performed.

Further, the spherical aberration compensation servo 309 analyzes a jitter value using the signal detected by the optical detector 307 to find, memorize, and study a characteristic optimum point of a signal while sweeping the whole operation range of the spherical aberration compensation actuator 200. In other words, the spherical aberration compensation servo 309 can analyze a jitter value using operation characteristics of the spherical aberration compensation servo 309 and characteristic changes of the beam focused on the optical disk. Accordingly, the spherical aberration compensation servo 309 can find a characteristic optimum point of the signal on the basis of the operation range of the spherical aberration compensation actuator 200 and store the optimum point. A repeated study may be possible using the stored optimum point.

Here, for studying the characteristic optimum point of the signal, a reference value is designated first and the spherical aberration compensation actuator 200 is moved to find an optimum point by applying a voltage of a predetermined size to the spherical aberration compensation actuator 200. If an optical characteristics is deteriorated again when the spherical aberration compensation servo 309 passes by the designated reference value, the spherical aberration compensation servo 309 is moved to an opposite direction. By repeating such an operation, the spherical aberration compensation servo 309 can find and memorize the optimum point.

In the meantime, FIG. 14 is a view illustrating another embodiment of an optical pickup system having a spherical aberration compensation actuator of the present invention.

Referring to FIG. 14, a spherical aberration compensation actuator 200 is installed between a beam splitter 322 and an object lens 335. Accordingly, laser beams generated from a blue laser diode 321 pass through a beam splitter 322 and the laser beams that have passed through the beam splitter 322 are converted into parallel beams by means of a collimator lens 211 mounted on a spherical aberration compensation actuator 200 and then pass through a HOE 334 and are incident to an object lens 335 and condensed to one point on an optical disk 325 of a high density.

If the beam focused on the optical disk 325 is reflected, the reflected beam passes through the object lens 335 and the collimator lens 211 again and is changed in its optical path by means of the beam splitter 326 and condensed to an optical detector 327 by means of a condensing lens 326. Accordingly, the optical detector 327 detects an electrical signal that corresponds to the condensed optical signal.

The signal detected by the optical detector 327 is delivered to a jitter signal detector 328. The jitter signal detector 328 detects a jitter signal to deliver the jitter signal to a spherical aberration compensation servo 329. At this point, the spherical aberration compensation servo 329 can control operation of the spherical aberration compensation actuator 200 using a servo signal on the basis of the delivered jitter signal. That is, the spherical aberration compensation servo 309 perform its servo operation for the spherical aberration compensation actuator 200 using a spherical aberration signal obtained by condensing the reflected light.

Here, the spherical aberration compensation servo 309 of FIG. 13 controls the servo on the basis of the signal obtained from the object lens, while the spherical aberration compensation servo 329 of FIG. 14 controls the servo by analyzing the optical signal that has passed through the object lens and then have passed through the spherical aberration compensation element.

A method for operating the spherical aberration compensation actuator 200 operates the actuator in a coarse manner and then performs a fine servo for precisely controlling the actuator at a position where the optimum characteristics comes out. For that purpose, a first servo is performed by applying a direct current (DC) voltage and then a position alignment and a precise servo are performed using an alternating current (AC) signal.

As described above, the BD-class optical pickup system of the present invention has a single-axis actuator installed on an optical path using electromagnetic and magnetic principles to compensate a non-linearity and twisting of a tilt angle during operation that may be generated in the actuator, thereby realizing an actuator having a simple construction.

According to the spherical aberration actuator and the optical pickup system, the spherical aberration compensation actuator is installed on the optical axis using the electromagnetic and magnetic principles so as to compensate the spherical aberration that may be generated in the BD-class optical system. Accordingly, a high-priced motor needs not to be additionally used and manufacturing cost is, remarkably reduced. Further, in case sensitivity and resolution adjustments are required during operation depending on system requests, it is possible to change the sensitivity and the resolution by adjusting a thickness and a size of the magnetic iron piece and a distance from the magnet.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A spherical aberration compensation actuator comprising:
    a spherical aberration compensation element for compensating a spherical aberration on an optical path;
    a lens holder for mounting the spherical aberration compensation element and operating to an optical-axis direction;
    magnetic circuits installed in left/right sides of the lens holder, wherein the magnetic circuits comprise coils, magnets, and yokes for generating electromagnetic force operating the lens holder;
    a rotation guider for guiding operation of the lens holder to an optical-axis direction; and
    a supporter for supporting the rotation guider and the yokes.

2. The actuator according to claim 1, wherein the spherical aberration compensation element is a collimator lens mounted on a center of the lens holder, for converting beams coming out from a blue laser light source into parallel beams.

3. The actuator according to claim 2, wherein the rotation guider comprises:
    shaft guide grooves formed in an optical-axis direction symmetrically with respect to the lens at a center height of a lens height direction and on left/right sides of the lens holder; and
    shafts whose centers are inserted into the shaft guide grooves and whose both ends are joined to the supporter.

4. The actuator according to claim 3, wherein the shaft guide grooves are formed in a different shape so as to give a degree of freedom of at least more than one directions to the lens holder by means of the shafts inserted into left/right sides of the lens holder.

5. The actuator according to claim 4, wherein the shaft guide grooves comprise:
    a shaft guide groove on one side formed in a polygonal shape on one side of the lens holder, for guiding the lens holder to up/down and left/right directions using the shafts inserted therein; and
    a shaft guide groove on the other side formed in a circular shape on the other side of the lens holder, for guiding the lens holder to left/right directions using the shafts inserted therein.

6. The actuator according to claim 3, wherein the supporter has shaft fixing grooves for fixing both ends of the shafts on an extended line of the shaft guide groove.

7. The actuator according to claim 1, wherein the magnetic circuits further comprise:
    coils attached to left/right sides of the lens holder;
    magnets facing the coils; and
    a U-shaped yoke plate in which the yokes having the magnets attached to their inner sides, are bent on its both side.

8. The actuator according to claim 7, wherein the magnets comprise a magnet having two poles whose polarities are divided to an optical-axis direction and a polar boundary of the magnet faces a center of the coils.

9. The actuator according to claim 1, wherein magnetic iron pieces for generating restoring force facing a polar boundary of the magnet are installed on left/right sides of the lens holder.

10. The actuator according to claim 1, wherein the supporter comprises:
left/right support frames for supporting a main body of the yoke in up/down/left/right directions; and
yoke fixing protuberances and yoke fixing grooves formed on the yokes and the support frames, for preventing the yokes from moving.

11. An optical pickup system comprising:
a laser diode for generating laser beams;
an object lens for condensing the laser beams onto an optical disk;
a spherical aberration compensation actuator installed on an optical path between the laser diode and the object lens and including a spherical aberration compensation element for compensating a spherical aberration generated by light that passes through the object lens and a lens holder for operating to an optical-axis direction under influence of electromagnetic force, and magnetic circuits arranged on left/right sides of the lens holder;
an optical path changer for selectively changing a path of the beams depending on their incident direction; and
an optical detector for detecting an electrical signal of the beams reflected from the disk.

12. The system according to claim 11, wherein the laser diode is a blue laser diode.

13. The system according to claim 11, wherein the spherical aberration compensation element is a collimator lens for converting the laser beams into parallel beams.

14. The system according to claim 11, wherein the magnetic circuits comprise coils, magnets, and yokes for operating the lens holder and the spherical aberration compensation actuator comprises:
a lens holder mounting a spherical aberration compensation element on its center and operating to an optical-axis direction;
a rotation guider including shafts and shaft guide grooves for guiding operation of the lens holder; and
a supporter for the yokes and the shafts in order to support operation of the lens holder.

15. The system according to claim 14, wherein the magnetic circuits comprise:
coils attached to left/right sides of the lens holder;
bipolar magnets facing the coils; and
a U-shaped yoke plate in which the yokes having the magnets attached to their inner sides, are bent and fixed to the supporter.

16. The system according to claim 11, further comprising a spherical aberration compensation actuator for receiving an electrical signal detected by the optical detector, and outputting a servo signal for actively compensating a spherical aberration on the basis of the electrical signal to the spherical aberration compensation actuator.

17. The system according to claim 16, wherein the spherical aberration compensation servo uses the electrical signal detected by the optical detector, the electrical signal being detected with reflected light reflected from the object lens not passing through the spherical aberration compensation element.

18. The system according to claim 11, wherein the spherical aberration compensation actuator is arranged at a front or a rear of the optical path changer.

19. The system according to claim 11, further comprising:
a jitter signal detector for detecting a jitter signal using the electrical signal detected by the optical detector; and
a spherical aberration compensation servo for outputting a servo signal for compensating a spherical aberration to the spherical aberration compensation actuator using the jitter signal detected by the jitter signal detector.

20. The system according to claim 19, wherein the spherical aberration compensation servo uses the electrical signal detected by the optical detector, the electrical signal being detected with reflected light reflected from the object lens passing through the spherical aberration compensation element.

* * * * *